United States Patent
Sun et al.

(10) Patent No.: US 12,277,089 B1
(45) Date of Patent: Apr. 15, 2025

(54) ARM SERVER AND STARTING METHOD AND APPARATUS THEREFOR, AND READABLE STORAGE MEDIUM

(71) Applicant: Suzhou MetaBrain Intelligent Technology Co., Ltd., Jiangsu (CN)

(72) Inventors: Xiuqiang Sun, Jiangsu (CN); Weifeng Gong, Jiangsu (CN); Wei Gong, Jiangsu (CN); Jiaming Huang, Jiangsu (CN); Yan Li, Jiangsu (CN); Siqiang Xu, Jiangsu (CN); Daotong Li, Jiangsu (CN); Peiwei Su, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/865,128

(22) PCT Filed: Jun. 28, 2023

(86) PCT No.: PCT/CN2023/103241
§ 371 (c)(1),
(2) Date: Nov. 12, 2024

(87) PCT Pub. No.: WO2024/103739
PCT Pub. Date: May 23, 2024

(30) Foreign Application Priority Data

Nov. 16, 2022 (CN) .......................... 202211430840.2

(51) Int. Cl.
*G06F 1/12* (2006.01)
*G06F 9/4401* (2018.01)
*G06F 13/42* (2006.01)

(52) U.S. Cl.
CPC ............ *G06F 13/4291* (2013.01); *G06F 1/12* (2013.01); *G06F 9/4403* (2013.01); *G06F 2213/0016* (2013.01)

(58) Field of Classification Search
CPC ................. G06F 1/12; G06F 1/32; G06F 9/44
See application file for complete search history.

(56) References Cited

U.S. PATENT DOCUMENTS

| 7,197,657 B1* | 3/2007 | Tobias ...................... G06F 1/14 713/400 |
| 2016/0328240 A1* | 11/2016 | Grandin ................ G06F 3/0632 |
| 2019/0346876 A1 | 11/2019 | Chen et al. |

FOREIGN PATENT DOCUMENTS

| CN | 1379327 A | 11/2002 |
| CN | 102749985 A | 10/2012 |

(Continued)

OTHER PUBLICATIONS

International Search Report of corresponding PCT application (PCT/CN2023/103241) Sep. 20, 2023, 6 pages.

(Continued)

*Primary Examiner* — Keshab R Pandey
(74) *Attorney, Agent, or Firm* — Cooper Legal Group, LLC (57) ABSTRACT

The present application relates to the technical field of computers. Disclosed are a starting method and apparatus for an Advanced RISC Machine (ARM) server, an ARM server, and a non-volatile computer-readable storage medium. The method includes: after a Basic Input Output System (BIOS) is started, setting a clock frequency of an Inter-Integrated Circuit (I2C) bus to a preset clock frequency by using the BIOS, where the preset clock frequency is a clock frequency at which a baseboard management controller (BMC) reads real-time clock (RTC) time through the I2C bus; initializing the I2C bus by using the BIOS, and starting and entering an operating system; reading the RTC time through the I2C bus by using the BIOS, and determining whether the BIOS successfully reads the RTC time; and if the BIOS successfully reads the RTC time, displaying, under (Continued)

the operating system, system time corresponding to the RTC time.

20 Claims, 5 Drawing Sheets (56) References Cited

FOREIGN PATENT DOCUMENTS

| CN | 107908413 A | 4/2018 |
|---|---|---|
| CN | 108415817 A | 8/2018 |
| CN | 113655846 A | 11/2021 |
| CN | 114201438 A | 3/2022 |
| CN | 114416187 A | 4/2022 |
| CN | 115495160 A | 12/2022 |

OTHER PUBLICATIONS

Written Opinion of International Searching Authority of corresponding PCT application (PCT/CN2023/103241) Sep. 20, 2023, 7 pages.
First CN Office Action of corresponding CN priority application (CN202211430840.2), mailed Jan. 4, 2023, 9 pages.
Notification to Grant Patent Right for Invention of corresponding CN priority application (CN202211430840.2), mailed on Feb. 6, 2023, 4 pages.

\* cited by examiner

ARM SERVER AND STARTING METHOD AND APPARATUS THEREFOR, AND READABLE STORAGE MEDIUM

CROSS-REFERENCE TO RELATED APPLICATION

This application is the national phase application of International Application No. PCT/CN2023/103241, filed Jun. 28 2023, which claims priority to Chinese Patent Application No. 202211430840.2, entitled "ARM SERVER AND STARTING METHOD AND APPARATUS THEREFOR, AND READABLE STORAGE MEDIUM", filed with the China National Intellectual Property Administration on Nov. 16, 2022, which is incorporated by reference in its entirety. The contents of International Application No. PCT/CN2023/103241 and Chinese Patent Application No. 202211430840.2 are incorporated herein by reference in their entireties.

FIELD

The present application relates to the field of computer technologies, and in particular, to a starting method and apparatus for an Advanced RISC Machine (ARM) server, an ARM server, and a non-volatile computer-readable storage medium.

BACKGROUND

With the development of digital technology, more and more end customers are choosing to deploy their services on a cloud. Meanwhile, software applications such as cloud games, cloud phones, or games on mobile phones all use a physical server of a data center. However, among many server products with different architectures, an Advanced RISC Machine (ARM) architecture server has particularly outstanding cost-effectiveness. Moreover, chips of mobile phones are ARM architectures too, which is more conducive to directly deploying applications of the mobile phones in the data centers of the ARM architecture servers.

However, for some software applications, it is necessary to constantly pay attention to the system time or system time difference to calculate the time consumption. An Inter-Integrated Circuit (I2C) bus that reads Real-Time Clock (RTC) time in an ARM architecture system is the same as an I2C bus that reads RTC time in a Baseboard Management Controller (BMC), but frequencies of reading the RTC time are not the same. This causes the I2C bus to read the RTC time at two different time frequencies, making it easy to cause the I2C bus to have a clock frequency confusion when some software frequently calls a time reading function. As a result, the ARM architecture system has a soft lockup problem. If the soft lockup occurs, the system will be all the time stuck in a waiting period for reading system time, causing other system processes and applications to be unable to use, resulting in the so-called downtime phenomenon. Because of this situation, end customers cannot keep playing games or their services will be suspended, resulting in huge economic losses.

Therefore, how to reduce the soft lockup crash of the ARM server caused by the clock frequency confusion of the I2C bus and improve the application scenarios of the ARM server is an urgent problem that needs to be solved now.

SUMMARY

The present application aims to provide a starting method and apparatus for an Advanced RISC Machine (ARM) server, an ARM server, and a non-volatile computer-readable storage medium, to reduce soft lockup crash of the ARM server caused by a clock frequency confusion of an Inter-Integrated Circuit (I2C) bus and improve the application scenarios of the ARM server.

To solve the above technical problems, according to a first aspect, the present application provides a starting method for an ARM server, including:

after a Basic Input Output System (BIOS) is started, setting a clock frequency of an I2C bus to a preset clock frequency by using the BIOS, where the preset clock frequency is a clock frequency at which a baseboard management controller (BMC) reads real-time clock (RTC) time through the I2C bus;

initializing the I2C bus by using the BIOS, and starting and entering an operating system;

reading the RTC time through the I2C bus by using the BIOS, and determining whether the BIOS successfully reads the RTC time; and if the BIOS successfully reads the RTC time, displaying, under the operating system, system time corresponding to the RTC time.

In an embodiment, before the initializing the I2C bus by using the BIOS, the method further includes:

setting a time delay of a read-write command on the I2C bus to preset delay time by using the BIOS, where the preset delay time is less than 1.5 s.

In an embodiment, the preset delay time is 50 ms.

In an embodiment, the reading the RTC time through the I2C bus by using the BIOS includes:

reading the RTC time in a single-byte manner by using the BIOS.

In an embodiment, after the determining whether the BIOS successfully reads the RTC time, the method further includes:

if the BIOS fails to read the RTC time, restarting the operating system.

In an embodiment, the reading the RTC time through the I2C bus by using the BIOS includes:

reading the RTC time through the I2C bus at the preset clock frequency by using the BIOS.

In an embodiment, the displaying, under the operating system, system time corresponding to the RTC time includes:

displaying the RTC time under the operating system.

In an embodiment, the determining whether the BIOS successfully reads the RTC time includes:

determining whether time data corresponding to the RTC time read by the BIOS is preset time; and if the time data is not the preset time, determining that the BIOS successfully reads the RTC time, and executing the step of displaying, under the operating system, system time corresponding to the RTC time.

In an embodiment, before the initializing the I2C bus by using the BIOS, the method further includes:

setting default time when the I2C bus fails to read the RTC time to the preset time by using the BIOS.

In an embodiment, after the determining whether time data corresponding to the RTC time read by the BIOS is preset time, the method further includes:

if the time data is the preset time, determining that the BIOS fails to read the RTC time, and displaying the preset time under the operating system.

In an embodiment, the number of year of the preset time is 0.

In an embodiment, the preset time is 0/0/0 0:0:0 (y/m/d h:m:s).

According to a second aspect, the present application further provides a starting apparatus for an ARM server, including:
- a configuration module, configured for: after a BIOS is started, setting a clock frequency of an I2C bus to a preset clock frequency by using the BIOS, where the preset clock frequency is a clock frequency at which a BMC reads RTC time through the I2C bus;
- an initialization module, configured for: initializing the I2C bus by using the BIOS, and starting and entering an operating system;
- a determining module, configured for: reading the RTC time through the I2C bus by using the BIOS, and determining whether the BIOS successfully reads the RTC time;
- and a display module, configured for: if the BIOS successfully reads the RTC time, displaying, under the operating system, system time corresponding to the RTC time.

The present application further provides an ARM server, including:
- a memory, configured for storing a computer program; and
- a processor, configured for running the computer program to implement the steps of the above starting method for the ARM server.

In addition, according to a third aspect, the present application further provides a non-volatile computer-readable storage medium, having a computer program stored thereon. The computer program, when run by a processor, implements the steps of the above starting method for the ARM server.

The present application provides a starting method for an ARM server, including: after a BIOS is started, setting a clock frequency of an I2C bus to a preset clock frequency by using the BIOS, where the preset clock frequency is a clock frequency at which a BMC reads RTC time through the I2C bus; initializing the I2C bus by using the BIOS, and starting and entering an operating system; reading the RTC time through the I2C bus by using the BIOS, and determining whether the BIOS successfully reads the RTC time; and if the BIOS successfully reads the RTC time, displaying, under the operating system, system time corresponding to the RTC time.

It can be seen that by setting the clock frequency of the I2C bus to the preset clock frequency by using the BIOS, making the BIOS and the BMC read the RTC time through the I2C bus at the same frequency, the present application avoids an I2C clock frequency confusion easily caused by reading the RTC time through the I2C at two different time frequencies, thereby reducing the soft lockup crash of the ARM server caused by the fact that services under a system frequently calls the system time and improving the application scenarios of the ARM server. Furthermore, by determining whether the BIOS successfully reads the RTC time, it can be convenient to determine whether there is a soft lockup crash during time reading, to ensure normal starting and running of the ARM server. In addition, the present application further provides a starting apparatus for an ARM server, an ARM server, and a non-volatile computer-readable storage medium, which have the same beneficial effects described above.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely the embodiments of the present application, and a person of ordinary skill in the art may still derive other drawings from the provided accompanying drawings without creative efforts.

DETAILED DESCRIPTION

In order to make the objectives, technical solutions, and advantages of the embodiments of the present application clearer, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

Figure 1:
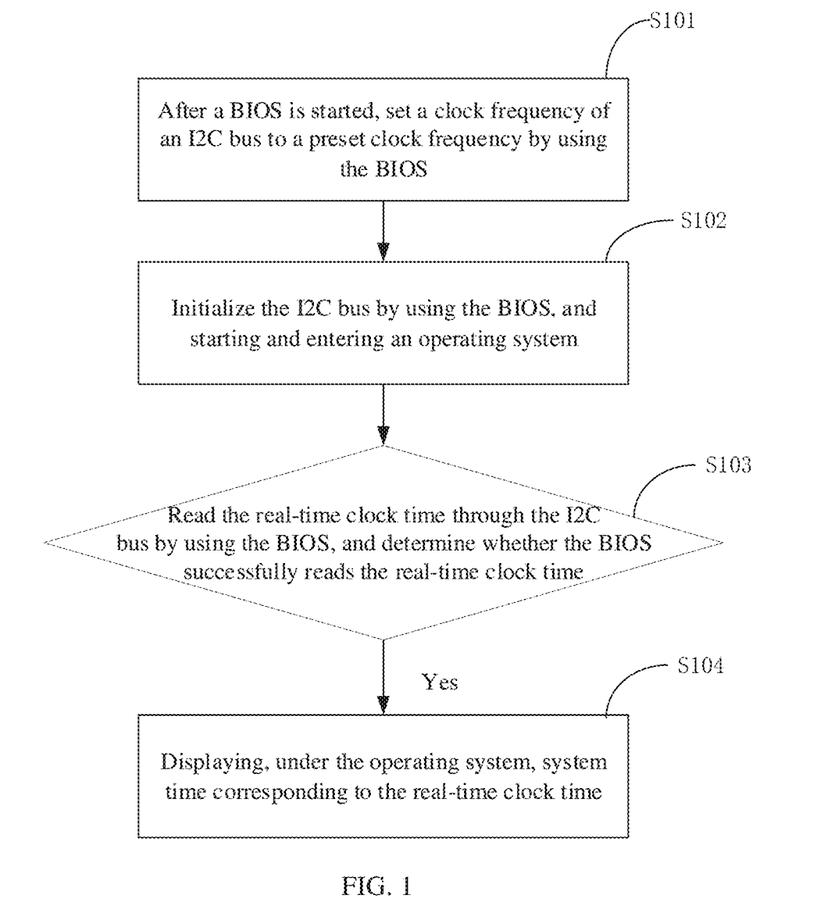
FIG. 1 is a flowchart of a starting method for an Advanced RISC Machine (ARM) server according to an embodiment of the present application.

Referring to FIG. 1, FIG. 1 is a flowchart of a starting method for an Advanced RISC Machine (ARM) server according to an embodiment of the present application. The method can include:

Step S101: after a Basic Input Output System (BIOS) is started, setting a clock frequency of an Inter-Integrated Circuit (I2C) bus to a preset clock frequency by using the BIOS.

The preset clock frequency is a clock frequency at which a baseboard management controller (BMC) reads real-time clock (RTC) time through the I2C bus.

In some embodiments, the starting method for the ARM server in this embodiment can be applied to an ARM server, namely, a server with an ARM architecture. To be specific, a processor of the ARM server (an ARM processor) can execute the steps of the method in this embodiment to complete the startup of the ARM server.

It can be understood that the clock frequency of the I2C bus in this step can be a frequency at which the BIOS reads the RTC time using the I2C bus. Although the I2C bus used by the ARM architecture to read the RTC time is consistent with an I2C bus used by a BMC to read the RTC time in the existing technology, the I2C buses have different clock frequency settings. Namely, a frequency at which the BIOS reads the RTC time using the I2C bus is not consistent with a frequency at which the BMC reads the RTC time using the I2C bus. For example, the frequency at which the BIOS reads the RTC time using the I2C bus is 400 kHz, and the frequency at which the BMC reads the RTC time using the I2C bus is 100 kHz. According to this, the I2C bus reads the RTC time at two different time frequencies, which can easily cause a clock frequency confusion in the I2C bus and lead to a soft lockup crash in a system. In this embodiment, the BIOS can be used to set the clock frequency of the I2C bus to the preset clock frequency that is the same as the clock frequency at which the BMC reads the RTC time through the I2C bus. This can ensure that the BIOS and the BMC read the RTC time at the same frequency through the I2C bus, ensuring that devices under the I2C bus read the RTC time at the same frequency through the I2C bus.

Figure 2:
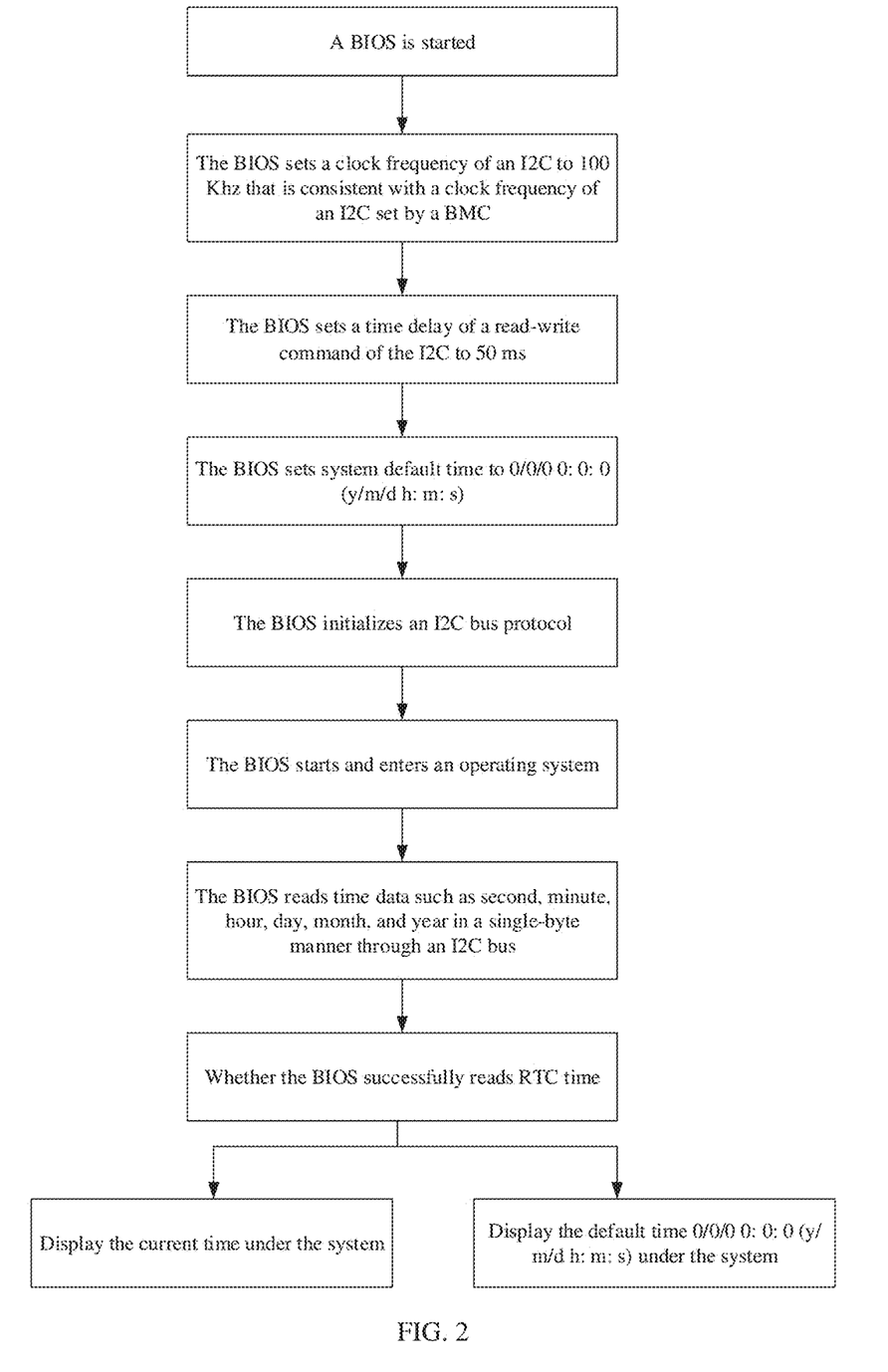
FIG. 2 is a schematic flowchart of another starting method for an ARM server according to an embodiment of the present application.

Correspondingly, the designer can set a specific value of the preset clock frequency in this embodiment, according to an actual scenario and a user need. As shown in FIG. 2, when the clock frequency of the I2C bus set by the BMC is 100 kHz, the preset clock frequency may be 100 kHz. Namely, in this step, the BIOS can be used to set the clock frequency of the I2C bus to 100 kHz, whereby the clock frequency of the I2C bus set by the BIOS is consistent with the clock frequency of the I2C bus set by the BMC.

In some embodiments, the I2C bus in this embodiment can be physically connected to an RTC unit, whereby the BIOS and the BMC can use the I2C bus to read time data corresponding to the RTC time from the RTC unit and obtain the RTC time.

Further, due to long waiting time for reading the RTC time through an I2C bus protocol in a running stage of the operating system, it is not beneficial for the accuracy and precision of the read RTC time. In some embodiments, before the I2C bus is initialized by using the BIOS, a time delay of a read-write command on the I2C bus can be set to preset delay time by using the started BIOS. The preset delay time is less than 1.5 s. To be specific, the BIOS can change a time delay interval of the read-write command for reading I2C data on the I2C bus from the default 1.5 s to shorter time (namely, the preset delay time), such as 50 ms in FIG. 2, to shorten the waiting time for the BIOS to read the RTC time through the I2C bus.

Further, when a hardware oscilloscope is used to capture an I2C data waveform of the read RTC time, it is found that there is a glitch phenomenon on a data signal line of the I2C bus, which will easily cause a time confusion due to inaccurate obtained time data. Namely, it is difficult to accurately determine whether the system time is artificially set or the system is back to the default time when the system is at default time. In this embodiment, before the I2C bus is initialized by using the BIOS, the default time when the I2C bus fails to read the RTC time can be set to preset time by using the started BIOS. The number of year of the preset time might be 0. As shown in FIG. 2, the BIOS might change the default time when the reading of the RTC time fails from 2022 Jan. 1 0:0:0 to 0/0/0 0:0:0 (namely, the preset time), to determine whether the BIOS successfully reads the RTC time under the operating system. Correspondingly, after starting and entering the operating system by using BIOS, the RTC time might be read in a single-byte manner by using the BIOS. Namely, the time data such as second, minute, hour, day, month, and year of the RTC time is read in the single-byte manner, instead of an existing multi-byte manner, so as to reduce the glitch phenomenon.

Step S102: initializing the I2C bus by using the BIOS, and starting and entering an operating system.

It might be understood that in this step, after using the BIOS to complete the adjustment of corresponding parameters (such as the clock frequency mentioned above) of the I2C bus protocol, the ARM server might initialize the I2C bus protocol using the BIOS, and normally start and enter the operating system to continue to complete the starting of the ARM server.

Step S103: reading the RTC time through the I2C bus by using the BIOS, and determining whether the BIOS successfully reads the RTC time; and if the BIOS successfully reads the RTC time, executing step S104.

It might be understood that in this step, the ARM server might use, under the operating system, the BIOS to read the RTC time through the I2C bus. For example, the ARM server might read the RTC time through the I2C bus at the preset clock frequency, and determine whether the BIOS successfully reads the RTC time, so as to determine whether there is a soft lockup crash during time reading, to ensure the normal starting and running of the ARM server.

Correspondingly, in a case of determining that the BIOS successfully reads the RTC time, namely, determining that there is no soft lockup crash during time reading, step S104 might be executed, whereby the ARM server might continue to normally run and display, under the operating system, system time corresponding to the RTC time. In a case of determining that the BIOS fails to read the RTC time, namely, determining that there is a soft lockup crash during time reading, as shown in FIG. 2, the ARM server might display, under the operating system, the default time (0/0/0 0:0:0 (y/m/d h:m:s) when the reading of the RTC time fails, to indicate the occurrence of the soft lockup crash during time reading. Or, the ARM server might restart itself or restart the operating system to achieve automatic system restart in case of the soft lockup crash.

In some embodiments, the specific method for determining whether the BIOS successfully reads the RTC time in this step might be set by the designer according to an actual scenario and a user need. For example, whether time data corresponding to the RTC time read by the BIOS is preset time (namely, the default time when the reading of the RTC time fails) is determined; if the time data is not the preset time, it determines that the BIOS successfully reads the RTC time, and step 104 is executed; and if the time data is the preset time, it determines that the BIOS fails to read the RTC time, and the preset time or preset warning time different from the preset time might be displayed under the operating system. As shown in FIG. 2, in this step, an application program under the operating system calls a BIOS runtime code by calling a system time reading function. The BIOS runtime code reads the time data such as second, minute, hour, day, month, and year of the RTC time under a current RTC in the single-byte manner, instead of the multi-byte manner, and determines whether the currently obtained RTC time is consistent with 0/0/0 0:0:0 (y/m/d h:m:s). If yes, the system time (namely, the current time) corresponding to the RTC time might be displayed under the operating system. If no, 0/0/0 0:0:0 (y/m/d h:m:s) (namely, the preset time) might be displayed under the operating system.

Step S104: displaying, under the operating system, system time corresponding to the RTC time.

It might be understood that in this step, the ARM server might display, under the operating system, the system time corresponding to the current RTC time when determining that the BIOS successfully reads the RTC time, to update the system time.

In some embodiments, the designer might set specific time of the system time in this step according to an actual scenario and a user need. For example, the system time is the same as the RTC time. Namely, the ARM server might use the RTC time currently successfully read by the BIOS as the system time under the operating system and display the RTC time under the operating system. The system time and the RTC time may be different. Namely, the ARM server might use the RTC time currently successfully read by the BIOS to obtain the system time displayed under the operating system. This embodiment does not impose any restrictions on this.

In this embodiment, by setting the clock frequency of the I2C bus to the preset clock frequency by using the BIOS, making the BIOS and the BMC read the RTC time through the I2C bus at the same frequency, the embodiments of the present application avoids an I2C clock frequency confusion easily caused by reading the RTC time through the I2C at two different time frequencies, thereby reducing the soft lockup crash of the ARM server caused by the fact that services under a system frequently calls the system time and improving the application scenarios of the ARM server. Furthermore, by determining whether the BIOS successfully reads the RTC time, it might be convenient to determine whether there is a soft lockup crash during time reading, to ensure normal starting and running of the ARM server.

Based on the above embodiments, the embodiments of the present application further provide another starting method for an ARM server, to further improve the accuracy of RTC time obtained by a BIOS and reduce a soft lockup crash of the ARM server.

Figure 3:
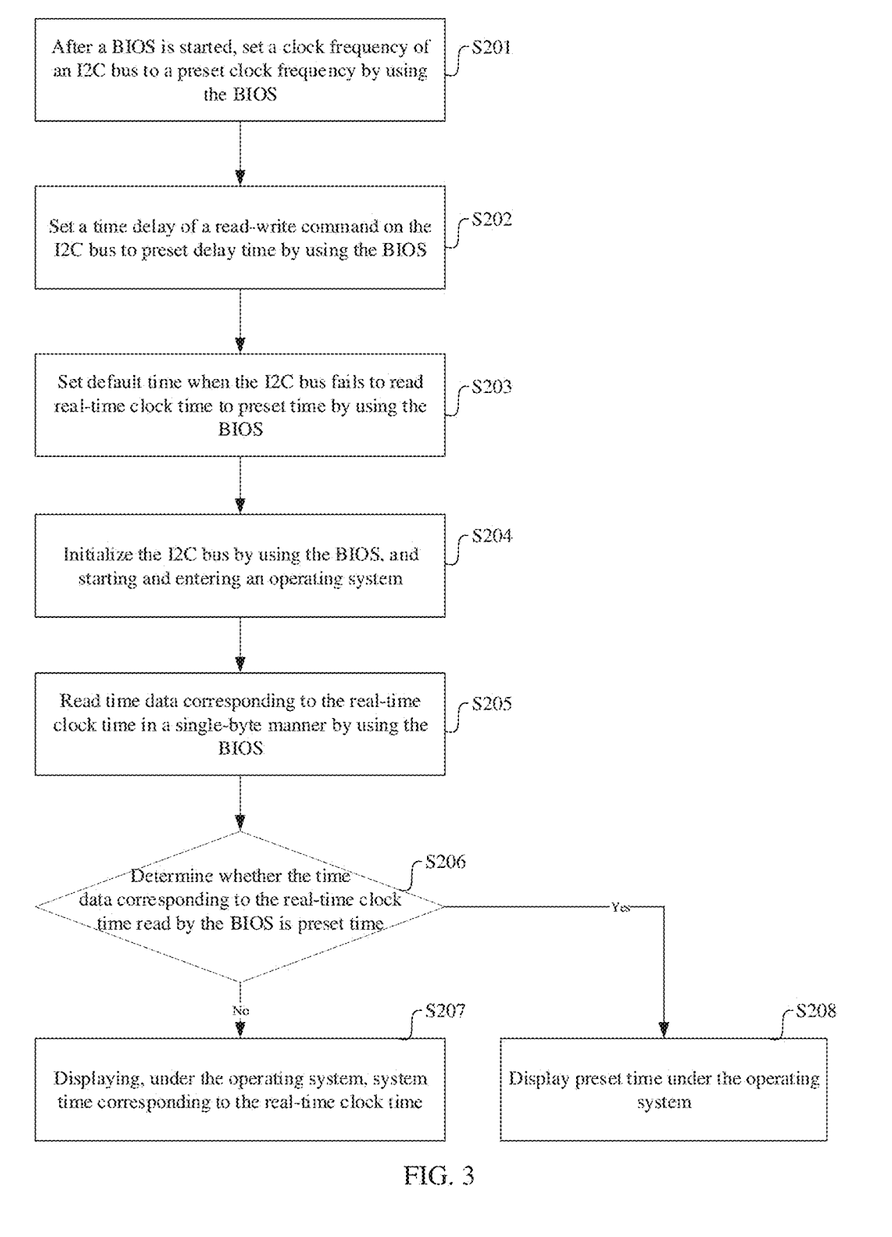
FIG. 3 is a flowchart of another starting method for an ARM server according to an embodiment of the present application.

In some embodiments, referring to FIG. 3, FIG. 3 is a flowchart of another starting method for an ARM server according to an embodiment of the present application. The method might include:

Step S201: after a BIOS is started, setting a clock frequency of an I2C bus to a preset clock frequency by using the BIOS.

The preset clock frequency is a clock frequency at which a BMC reads real-time clock time through the I2C bus.

In some embodiments, the designer might set a specific value of the preset clock frequency in this embodiment, according to an actual scenario and a user need. As shown in FIG. 2, when the clock frequency of the I2C bus set by the BMC is 100 kHz, the preset clock frequency may be 100 kHz. Namely, in this step, the BIOS might be used to set the clock frequency of the I2C bus to 100 kHz, whereby the clock frequency of the I2C bus set by the BIOS is consistent with the clock frequency of the I2C bus set by the BMC. It avoids the situation that the I2C bus reads the RTC time at two different time frequencies and prevents a clock frequency confusion in the I2C bus. This embodiment does not impose any restrictions on this as long as it ensures that the preset clock frequency in this embodiment is the same as the clock frequency at which the BMC reads RTC time through the I2C bus.

Step S202: setting a time delay of a read-write command on the I2C bus to preset delay time by using the BIOS.

The preset delay time is less than 1.5 s.

It might be understood that in this step, the BIOS might adjust the time delay of the read-write command on the I2C bus to a time value less than 1.5 s, so as to shorten the waiting time for reading time data through the I2C bus. The designer might set a specific time value of the preset delay time in this step according to an actual scenario and a user need. As shown in FIG. 2, the preset delay time might be 50 ms, which means that the BIOS might change a time delay interval of the read-write command for reading I2C data on the I2C bus from the existing default 1.5 s to 50 ms, to shorten the waiting time for reading data through the I2C bus. The preset delay time may be 100 ms or another time less than 1.5 s. This embodiment does not impose any restrictions on this as long as it ensures that the preset delay time might be less than 1.5 s.

Step S203: setting default time when the I2C bus fails to read the RTC time to preset time by using the BIOS.

Among them, the number of year of the preset time in this embodiment may be 0, so as to distinguish artificially set system time from the default time restored by the system.

In some embodiments, the designer might set a specific time point of the preset time in this step according to an actual scenario and a user need. For example, when the preset time includes year, month, day, hour, minute, and second, as shown in FIG. 2, the preset time may be 0/0/0 0:0:0 (y/m/d h:m:s), namely, the numbers for the year, month, day, hour, minute, and second of the preset time are all 0. For example, the BIOS might change the default time when the reading of the RTC time fails from the existing 2022/1/0:0:0 to 0/0/0 0:0:0 (y/m/d h:m:s), whereby the operating system might confirm whether the obtaining of the current time fails.

It should be noted that the designer might set a specific logic order of step S201 to step S203 after the BISO is started. Step S201, step S202, and step S203 might be executed in sequence as shown in this embodiment, or the three steps might be executed in sequence according to another order or simultaneously. This embodiment does not impose any restrictions on this as long as the three steps might be completed before the I2C bus is initialized by using the BIOS.

Step S204: initializing the I2C bus by using the BIOS, and starting and entering an operating system.

In this step, after using the BIOS to complete the adjustment of corresponding parameters (such as the clock frequency, the time delay, and the default time mentioned above) of the I2C bus protocol, the ARM server might initialize the I2C bus protocol using the BIOS, and normally start and enter the operating system to continue to complete the starting of the ARM server.

In some embodiments, the designer might set a specific way in which the ARM server initializes the I2C bus by using the BIOS and starts and enters the operating system. For example, the specific way might be achieved using a method that is the same as or similar to a BIOS-based I2C bus protocol initialization method and an operating system starting method in the existing technology. This embodiment does not impose any restrictions on this.

Step S205: reading time data corresponding to the RTC time in a single-byte manner by using the BIOS.

It might be understood that in this step, under the operating system, the ARM server might use BIOS to read the time data corresponding to the RTC time in the single-byte manner. The time data may include second, minute, hour, day, month, and year. For example, an application program under the operating system might call a BIOS runtime code by calling a system time reading function. The BIOS runtime code reads the time data such as second, minute, hour, day, month, and year of the RTC time of the current RTC in the single-byte manner, instead of a multi-byte manner.

Step S206: determining whether the time data corresponding to the RTC time read by the BIOS is preset time; if the time data corresponding to the RTC time read by the BIOS is not the preset time, executing step S207; and if the time data corresponding to the RTC time read by the BIOS is the preset time, executing step S208.

It might be understood that in this step, the ARM server might determine whether the BIOS successfully reads the RTC time by determining whether the time data corresponding to the RTC time read by the BIOS is the preset time (namely, the default time when the I2C bus fails to read the RTC time). Whereby, when the time data is not the preset time, it determines that the BIOS successfully reads the RTC time, to display the corresponding system time under the operating system.

In some embodiments, the designer might set a specific time point of the preset time in this step according to an actual scenario and a user need. For example, when the preset time includes year, month, day, hour, minute, and second, as shown in FIG. 2, the preset time may be 0/0/0 0:0:0 (y/m/d h:m:s), namely, the numbers for the year, month, day, hour, minute, and second of the preset time are all 0. To be specific, the BIOS might change the default time (namely, the preset time) when the reading of the RTC time fails from the existing 2022 Jan. 1 0:0:0 to 0/0/0 0:0:0 (y/m/d h:m:s), whereby the operating system might confirm whether the obtaining of the current time fails.

Correspondingly, in this step, when the ARM server determines that the time data corresponding to the RTC time read by the BIOS is not the preset time, namely, when the BIOS successfully reads the RTC time and there is no soft lockup crash during time reading, step S207 might be executed, whereby the ARM server might continue to run normally and display, under the operating system, the system time corresponding to the RTC time. When the ARM server determines that the time data corresponding to the RTC time read by the BIOS is the preset time, namely, when the BIOS fails to read the RTC time and there is a soft lockup crash during time reading, step 208 might be executed, whereby the ARM server might display the preset time under the operating system, such as 0/0/0 0:0:0 (y/m/d h:m:s) shown in FIG. 2, to indicate the occurrence of the soft lockup crash during time reading.

Step S207: displaying, under the operating system, system time corresponding to the RTC time.

In this step, when determining that the time data corresponding to the RTC time read by the BIOS is not the preset time, namely, when the BIOS successfully reads the RTC time, the ARM server might display, under the operating system, the system time corresponding to the RTC time, such as, directly displaying the RTC time successfully read by the BIOS, namely, the system time is the RTC time.

In some embodiments, the designer might set specific time of the system time in this step according to an actual scenario and a user need. For example, the system time is the same as the RTC time. Namely, the ARM server might use the RTC time currently successfully read by the BIOS as the system time under the operating system and display the RTC time under the operating system. Namely, the ARM server might directly display the RTC time. The system time and the RTC time may be different. Namely, the ARM server might use the RTC time currently successfully read by the BIOS to obtain the system time displayed under the operating system. This embodiment does not impose any restrictions on this.

Step S208: displaying preset time under the operating system.

It might be understood that when determining that the time data corresponding to the RTC time read by the BIOS is not the preset time, namely, when the BIOS fails to read the RTC time, the ARM server might display the preset time under the operating system, such as, 0/0/0 0:0:0 (y/m/d h:m:s), to indicate the occurrence of the soft lockup crash during time reading.

It should be noted that in this embodiment, by way of example, the ARM server displays the preset time under the operating system when determining that the BIOS fails to read the RTC time, to prompt a user of the occurrence of the soft lockup crash during time reading. Or, when determining that the BIOS fails to read the RTC time, the ARM server may display, under the operating system, preset warning time different from the preset time, and prompt a user of the occurrence of the soft lockup crash during time reading through the displaying of the preset warning time. Or, when the BIOS fails to read the RTC time, the ARM server or the operating system is restarted to achieve automatic system restart in case of the soft lockup crash. This embodiment does not impose any restrictions on this.

In this embodiment, the embodiments of the present application set the clock frequency of the I2C of the RTC unit when the BIOS is started to reduce the time delay of reading the RTC time through the I2C. The default time when the reading of the RTC time fails is set to the preset time, and the RTC time is read in the single-byte manner, whereby the soft lockup crash of the system caused by frequent calling of the system time under the operating system might be solved, and the ARM server might be suitable for cloud services, Ranger services, video services, and other mainstream Internet applications, thereby improving the application scenarios of the ARM server, facilitating Internet subscribers to purchase and deploy ARM servers in a large scale, reducing the purchase cost of the Internet subscribers, and increasing the service profit rate.

Corresponding to the above method embodiment, the embodiments of the present application further provide a starting apparatus for an ARM server. The starting apparatus for the ARM server described below may correspond to the starting method for the ARM server described above for reference.

Figure 4:
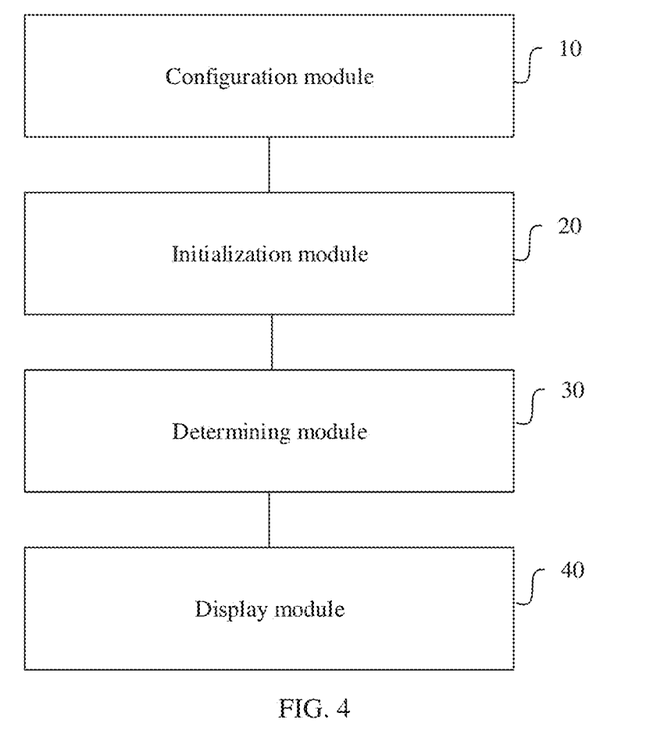
FIG. 4 is a structural block diagram of a starting apparatus for an ARM server according to an embodiment of the present application.

Referring to FIG. 4, FIG. 4 is a structural block diagram of a starting apparatus for an ARM server according to an embodiment of the present application. The apparatus might include:

a configuration module 10, configured for: after a BIOS is started, setting a clock frequency of an I2C bus to a preset clock frequency by using the BIOS, where the preset clock frequency is a clock frequency at which a BMC reads RTC time through the I2C bus;

an initialization module 20, configured for: initializing the I2C bus by using the BIOS, and starting and entering an operating system;

a determining module 30, configured for: reading the RTC time through the I2C bus by using the BIOS, and determining whether the BIOS successfully reads the RTC time; and a display module 40, configured for: if the BIOS successfully reads the RTC time, displaying, under the operating system, system time corresponding to the RTC time.

In an embodiment, the configuration module 10 might further include:

a delay configuration submodule, configured for setting a time delay of a read-write command on the I2C bus to preset delay time by using the BIOS, where the preset delay time is less than 1.5 s.

In an embodiment, the preset delay time is 50 ms.

In an embodiment, the determining module 30 might include:

a reading submodule, configured for reading the RTC time in a single-byte manner by using the BIOS.

In an embodiment, the apparatus might further include:

a restarting module, configured for: if the BIOS fails to read the RTC time, restarting the operating system.

In an embodiment, the determining module 30 might include:
a reading submodule, configured for reading the RTC time through the I2C bus according to the preset clock frequency by using the BIOS.

In an embodiment, the display module 40 is in some embodiments configured for displaying the RTC time under the operating system.

In an embodiment, the determining module 30 might include:
a determining submodule, configured for: determining whether time data corresponding to the RTC time read by the BIOS is preset time; and if the time data is not the preset time, determining that the BIOS successfully reads the RTC time, and sending a start signal to the display module 40.

In an embodiment, the configuration module 10 might further include:
a default configuration submodule, configured for setting default time when the reading of the RTC time through the I2C bus fails to the preset time by using the BIOS.

In an embodiment, the apparatus might further include:
a warning display module, configured for: if the time data is not the preset time, determining that the BIOS fails to read the RTC time, and displaying the preset time under the operating system.

In an embodiment, the number of year of the preset time is 0.

In an embodiment, the preset time is 0/0/0 0:0:0 (y/m/d h:m:s).

In this embodiment, by setting, through the configuration module 10, the clock frequency of the I2C bus to the preset clock frequency by using the BIOS, making the BIOS and the BMC read the RTC time through the I2C bus at the same frequency, the embodiments of the present application avoids an I2C clock frequency confusion easily caused by reading the RTC time through the I2C at two different time frequencies, thereby reducing the soft lockup crash of the ARM server caused by the fact that services under a system frequently calls the system time and improving the application scenarios of the ARM server. Furthermore, by determining, through the determining module 30, whether the BIOS successfully reads the RTC time, it might be convenient to determine whether there is a soft lockup crash during time reading, to ensure normal starting and running of the ARM server.

Corresponding to the above method embodiment, the embodiments of the present application further provide an ARM server. The ARM server described below may correspond to the starting method for the ARM server described above for reference.

Figure 5:
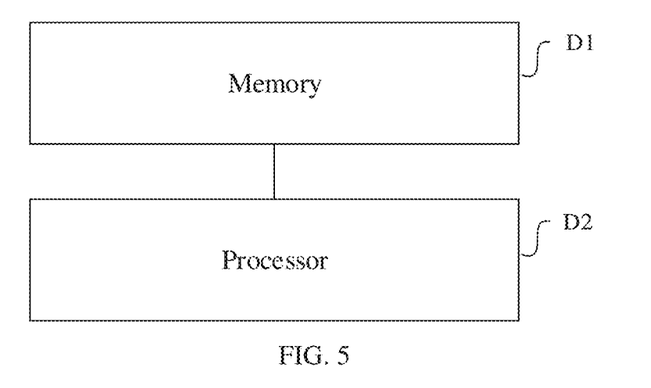
FIG. 5 is a schematic structural diagram of an ARM server according to an embodiment of the present application.

Referring to FIG. 5, FIG. 5 is a schematic structural diagram of an ARM server according to an embodiment of the present application. The ARM server might include:
a memory D1, configured for storing a computer program; and
a processor D2, configured for running the computer program to implement the steps of the starting method for the ARM server provided in the above method embodiment.

Figure 6:
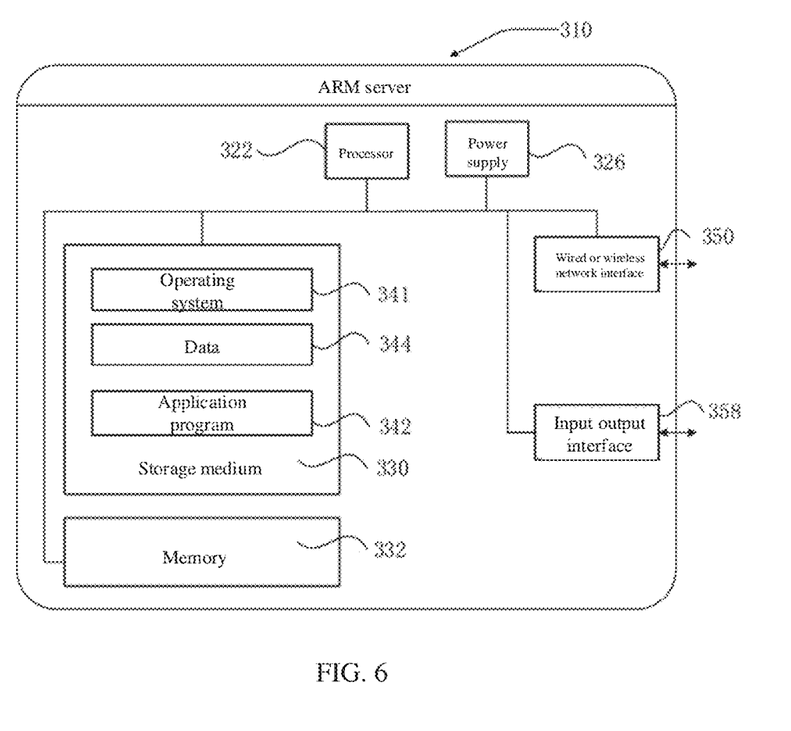
FIG. 6 is a specific schematic structural diagram of an ARM server according to an embodiment of the present application.

In some embodiments, referring to FIG. 6, FIG. 6 is a specific schematic structural diagram of an ARM server according to an embodiment of the present application. The ARM server 310 may vary significantly depending on configuration or performance, and may include one or more processors (such as an ARM processor) 322 (for example, one or more ARM processors), a memory 332, and one or more storage media 330 (for example, one or more mass storage devices) configured for storing an application program 342 or data 344. The memory 332 and the storage media 330 might achieve short-term storage or persistent storage. The program stored in the storage media 330 may include one or more modules (not shown), and each module may include a series of instruction operations performed on a data processing device. Still further, a central processing unit 322 might be configured for communicating with the storage media 330 and perform the series of instruction operations in the storage media 330 on the ARM server 310.

The ARM server 310 may further include one or more power supplies 326, one or more wired or wireless network interfaces 350, one or more input/output interfaces 358, and/or one or more operating systems 341, for example, Windows Server™, Mac OS X™, Unix™, Linux™, and FreeBSD™.

The ARM server 310 might be in some embodiments a server with an ARM architecture.

The steps in the starting method for the ARM server described above might be implemented by the structure of the ARM server.

Corresponding to the above method embodiment, the embodiments of the present application further provide a non-volatile computer-readable storage medium. The non-volatile computer-readable storage medium described below may correspond to the starting method for the ARM server described above for reference.

The non-volatile computer-readable storage medium has a computer program stored thereon. The computer program, when run by a processor, implements the steps of the starting method for the ARM server provided in the above method embodiment.

The non-volatile computer-readable storage media may be in some embodiments: various readable storage media that might store program codes, such as a USB flash drive, a mobile hard disk drive, a Read-Only Memory (ROM), a Random Access Memory (RAM), a magnetic disk, or a compact disc.

The various embodiments in this specification are described in a progressive manner, and each embodiment focuses on differences from other embodiments. The same and similar parts between all the embodiments might be referred to each other. Since the apparatus, the ARM server, and the non-volatile computer-readable storage medium disclosed in the embodiments correspond to the method disclosed in the embodiments, they are described simply, and related parts refer to some of the explanations of the method.

A person skilled in the art may further realize that units and algorithm steps of all the examples described in the foregoing embodiments disclosed herein may be implemented by electronic hardware, computer software, or a combination thereof. To clearly describe the interchangeability between the hardware and the software, the foregoing has generally described compositions and steps of each example based on functions. Whether these functions are implemented as hardware or software depends on particular application and design constraint conditions of the technical solutions. A person skilled in the art may use different methods to implement the described functions for each particular application, but it should not be considered that the implementation goes beyond the scope of the present application.

The steps of the method or algorithm described in conjunction with the embodiments disclosed herein might be implemented directly using hardware, software modules executed by the processor, or a combination thereof. The software modules might be placed in a RAM, an internal memory, a ROM, an EPROM, EEPROM, a register, a hard disk drive, a removable disk, a CD-ROM, or a storage medium in any other form known in the technical field.

The starting method and apparatus for the ARM server, the ARM server, and the computer-readable storage medium provided by the present application have been introduced in detail above. The principles and implementations of the present application are explained herein with specific examples, and the explanations of the above embodiments are only used to help understand the method of the present application and a core idea of the method. It should be pointed out that a person of ordinary skill in the art might also make several improvements and modifications to the present application without departing from the principles of the present application, and these improvements and modifications also fall within the scope of protection of the claims of the present application.

What is claimed is:

1. A starting method for an Advanced Reduced Instruction Set Computer Machine (ARM) server, comprising:
    after a Basic Input Output System (BIOS) is started, setting a clock frequency of an Inter-Integrated Circuit (I2C) bus to a preset clock frequency by using the BIOS, wherein the preset clock frequency is a clock frequency at which a Baseboard Management Controller (BMC) reads Real-Time Clock (RTC) time through the I2C bus;
    initializing the I2C bus by using the BIOS, and starting and entering an operating system;
    reading the RTC time through the I2C bus by using the BIOS, and determining whether the BIOS successfully reads the RTC time; and
    in response to the BIOS successfully reading the RTC time, displaying, under the operating system, system time corresponding to the RTC time.

2. The starting method for the ARM server according to claim 1, wherein before the initializing the I2C bus by using the BIOS, further comprising:
    setting a time delay of a read-write command on the I2C bus to preset delay time by using the BIOS, wherein the preset delay time is less than 1.5 s.

3. The starting method for the ARM server according to claim 2, wherein the preset delay time is 50 ms.

4. The starting method for the ARM server according to claim 1, wherein the reading the RTC time through the I2C bus by using the BIOS comprises:
    reading the RTC time in a single-byte manner by using the BIOS.

5. The starting method for the ARM server according to claim 1, wherein after the determining whether the BIOS successfully reads the RTC time, further comprising:
    in response to the BIOS failing to read the RTC time, restarting the operating system.

6. The starting method for the ARM server according to claim 1, wherein the reading the RTC time through the I2C bus by using the BIOS comprises:
    reading the RTC time through the I2C bus according to the preset clock frequency by using the BIOS.

7. The starting method for the ARM server according to claim 1, wherein the displaying, under the operating system, system time corresponding to the RTC time comprises:
    displaying the RTC time under the operating system.

8. The starting method for the ARM server according to claim 1, wherein the determining whether the BIOS successfully reads the RTC time comprises:
    determining whether time data corresponding to the RTC time read by the BIOS is preset time; and
    in response to the time data being not the preset time, determining that the BIOS successfully reads the RTC time, and executing the displaying, under the operating system, system time corresponding to the RTC time.

9. The starting method for the ARM server according to claim 8, wherein before the initializing the I2C bus by using the BIOS, further comprising:
    setting default time in a situation where the I2C bus fails to read the RTC time to the preset time by using the BIOS.

10. The starting method for the ARM server according to claim 8, wherein after the determining whether time data corresponding to the RTC time read by the BIOS is preset time, further comprising:
    in response to the time data being the preset time, determining that the BIOS fails to read the RTC time, and displaying the preset time under the operating system.

11. The starting method for the ARM server according to claim 8, wherein a value of a year byte of the preset time is 0.

12. The starting method for the ARM server according to claim 11, wherein the preset time is 0/0/0 0:0:0 (y/m/d h:m:s).

13. The starting method for the ARM server according to claim 1, wherein the in response to the BIOS successfully reading the RTC time, displaying, under the operating system, system time corresponding to the RTC time comprises:
    in response to there being no soft lockup crash during an RTC time reading, displaying, under the operating system, system time corresponding to the RTC time.

14. The starting method for the ARM server according to claim 5, wherein the in response to the BIOS failing to read the RTC time, restarting the operating system comprises:
    in response to there being a soft lockup crash during an RTC time reading, restarting the operating system.

15. The starting method for the ARM server according to claim 1, wherein after the determining whether the BIOS successfully reads the RTC time, further comprising:
    indicating an occurrence of a soft lockup crash during an RTC time reading.

16. An Advanced Reduced Instruction Set Computer Machine (ARM) server, comprising:
    a memory, configured for storing a computer program; and
    a processor, configured for running the computer program to implement a starting method for the ARM server, comprising:
        after a Basic Input Output System (BIOS) is started, setting a clock frequency of an Inter-Integrated Circuit (I2C) bus to a preset clock frequency by using the BIOS, wherein the preset clock frequency is a clock frequency at which a Baseboard Management Controller (BMC) reads Real-Time Clock (RTC) time through the I2C bus;
        initializing the I2C bus by using the BIOS, and starting and entering an operating system;
        reading the RTC time through the I2C bus by using the BIOS, and determining whether the BIOS successfully reads the RTC time; and
        in response to the BIOS successfully reading the RTC time, displaying, under the operating system, system time corresponding to the RTC time.

17. A non-volatile computer-readable storage medium, having a computer program stored thereon, wherein the computer program, when run by a processor, implements a starting method for an Advanced Reduced Instruction Set Computer Machine (ARM) server, comprising:
    after a Basic Input Output System (BIOS) is started, setting a clock frequency of an Inter-Integrated Circuit (I2C) bus to a preset clock frequency by using the BIOS, wherein the preset clock frequency is a clock frequency at which a Baseboard Management Controller (BMC) reads Real-Time Clock (RTC) time through the I2C bus;
    initializing the I2C bus by using the BIOS, and starting and entering an operating system;
    reading the RTC time through the I2C bus by using the BIOS, and determining whether the BIOS successfully reads the RTC time; and
    in response to the BIOS successfully reading the RTC time, displaying, under the operating system, system time corresponding to the RTC time.

18. The starting method for the ARM server according to claim 8, wherein after the determining whether time data corresponding to the RTC time read by the BIOS is preset time, further comprising:
    in response to the time data being the preset time, determining that the BIOS fails to read the RTC time, and displaying, under the operating system, preset warning time different from the preset time.

19. The starting method for the ARM server according to claim 1, wherein the I2C bus is physically connected to an RTC unit; and the reading the RTC time through the I2C bus by using the BIOS comprises:
    obtaining, by the BMC, the RTC time by reading time data corresponding to the RTC time from the RTC unit through the I2C bus.

20. The starting method for the ARM server according to claim 19, wherein the reading the RTC time through the I2C bus by using the BIOS comprises:
    reading, by the BIOS, the time data corresponding to the RTC time from the RTC unit through the I2C bus, and obtaining the RTC time.

\* \* \* \* \*